United States Patent Office 2,879,294
Patented Mar. 24, 1959

2,879,294

1,1-DIARYL-2-AMINOALKANOLS

Kenneth N. Campbell, Evansville, Ind., assignor to Mead Johnson & Company, Evansville, Ind., a corporation of Indiana No Drawing. Application January 25, 1956
Serial No. 561,348

4 Claims. (Cl. 260—570)

This invention relates to new compositions of matter and more specifically to 1,1-diaryl-2-aminoalkanols of the formula:

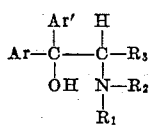

wherein Ar and Ar' are aryl groups such as phenyl, $R_1$ and $R_2$ are hydrogen or lower alkyl such as for example methyl and ethyl groups, and $R_3$ is an aliphatic straight chain hydrocarbon radical, containing from 4 to 6 carbon atoms. The present invention also contemplates the acid addition or quaternary ammonium salts of the present compounds as herein disclosed. A most preferred embodiment of the present invention is the class of compounds selected from the group consisting of 1,1-diphenyl-2-dimethylaminohexanol; 1,1-diphenyl-2-ethylaminohexanol; and 1,1-diphenyl-2-aminoheptanol.

The compounds of the present invention are useful as central nervous system stimulants, and the compounds disclosed as the preferred embodiment of the present invention display central nervous system stimulant properties at an unexpectedly high and efficient level. Generally these compounds may be advantageously administered in an oral manner in the form of capsules, tablets, and elixirs. The dosage should be from about 1 to 25 milligrams per capsule administered from one to three times daily to achieve the desired therapeutic effect.

In accordance with the present invention the above described 1,1-diaryl-2-aminoalkanols may be prepared by several methods.

METHOD A

One method useful in the preparation of the present novel compositions involves the reaction of an excess of an aromatic Grignard reagent or an aromatic lithium reagent with the ester of an alpha amino acid; or with the salt of such ester. The reaction proceeds according to the following equation:

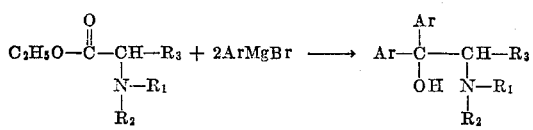

It will be noted that by this method the Ar groups introduced will be identical.

METHOD B

Another method useful to prepare the present compositions is the reaction of an aromatic Grignard reagent or aromatic lithium derivative with the oxime of an arylalkyl ketone. The ethylenimine intermediate product can then be hydrolyzed to the corresponding amino alcohol with a dilute mineral acid and the amino alcohol can be alkylated (if desired) on the amine nitrogen to introduce the desired alkyl groups therein.

The compounds whose preparation is described herein may also be used in the form of salts by reaction of the amine product with organic or inorganic acids or alkyl halides in the manner known to those skilled in the art to prepare soluble salts of these therapeutic compounds, and where the amine starting material is a tertiary amine to prepare quaternary ammonium compounds. It is of course necessary that the acids or alkyl halides used in the preparation of these salts be nontoxic either by themselves or in effect after reaction with the amine.

The following examples will illustrate the methods used in preparing the compositions of the present invention. While many of the starting materials are known and reference thereto is made, several starting materials are new in the art and their preparation is shown specifically, though the teachings thereof are applicable for preparing other similar compounds used as starting materials in the preparation of the compositions of the present invention.

Example I 1,1-DIPHENYL-2-DIMETHYLAMINOHEXANOL

The starting material, ethyl-α-dimethylaminohexanoate was prepared from commercially available α-bromohexanoic acid by the method of Leonard and Ruyle, J.A.C.S. 71, 3095 (1949), and boiled at 92° to 96° C. at 13 mm. Hg pressure.

A solution of 9.35 grams (0.05 mole) of ethyl-α-dimethylaminohexanoate in 50 milliliters of anhydrous ethyl ether was added in a dropwise manner, while stirring, to an ethyl ether solution of 0.15 mole of phenylmagnesium bromide while cooling in an ice bath. The reaction mixture was then stirred at room temperature for about forty-five minutes followed by heating under gentle reflux for two hours. The reaction mixture was then poured onto crushed ice and treated with ammonium chloride to dissolve precipitated magnesium hydroxide. The ether layer was removed and the aqueous layer was extracted three times with ethyl ether. The combined ether layers were dried over anhydrous magnesium sulfate and the ether solvent removed by atmospheric distillation. The oily residue was then distilled under reduced pressure to give 11.8 grams (80% of theory) of the desired 1,1-diphenyl-2-dimethylaminohexanol, B.P. 160° to 166° C. at 0.6 mm. Hg pressure. The hydrochloride salt was hygroscopic.

Example II 1,1-DIPHENYL-2-ETHYLAMINOHEXANOL

The starting material ethyl-α-ethylaminohexanoate was prepared as follows: A solution of 30 grams of α-bromohexanoic acid in 300 milliliters of 70% aqueous ethylamine was allowed to stand at room temperature for three days, and then concentrated by heating under vacuum in a steam bath to a solid residue. The solid residue was dissolved in 600 milliliters of 5.9% alcoholic hydrogen chloride and solution refluxed for four hours. The solution was then concentrated in a steam bath under vacuum to a syrupy residue which was then cooled in an ice bath and over-layered with ethyl ether. 150 milliliters of 15% aqueous potassium carbonate was added to the reaction mixture and the flask shaken and the two liquid layers allowed to separate. The ether portion was decanted and the aqueous layer was extracted further with three 100 milliliter portions of ethyl ether. The ether fractions were combined and washed successively with aqueous potassium carbonate solution, water, and saturated aqueous sodium chloride solution. The ethereal solution was then dried over anhydrous magnesium sulfate, concentrated by evaporation in a steam bath and the resulting liquid residue distilled to yield a clear white liquid boiling at 96° C. at 15 millimeters Hg pressure. The refractive index of the product was $n^{20}D$ 1.4348.

The ethyl-α-ethylaminohexanoate as prepared above was reacted with phenyl magnesium bromide according to the scheme of Method A, and the foregoing Example I, to produce the desired 1,1-diphenyl-2-ethylaminohexanol having a melting point of 72 to 73° C. A hydrochloride salt was made which had hydroscopic properties.

*Example III*

PREPARATION OF 1,1-DIPHENYL-2-AMINOHEPTANOL

The starting material for this compound was prepared as follows:

The α-aminoheptanoic acid having a melting point of 284° C. to 285° C. was prepared by the method of J. Parrod, Bull. Soc. Chim., France, 1951, 420-3; C. A. 46: 2049d (1952). The ethyl-α-aminoheptanoate having a boiling point of 106° C. at 15 millimeters of mercury pressure and refractive index $n^{20}D$ 1.4320, was prepared by the method of S. Akabori and S. Numano, Ber. 66B, 159 (1933). The resulting ethyl-α-aminoheptanoate was reacted with phenyl magnesium bromide according to the procedure of Method A and as shown in Example I, to produce a crude product melting 55° C. to 65° C. The purified hydrochloride salt had a melting point of 223° C. to 224° C.

The foregoing examples illustrate the general methods useful in the preparation of the compounds of the present invention.

Quaternary ammonium compounds of the products of the present invention may be prepared by reacting the amines with alkyl halides, as is well known in the art. Salts of the present amine compositions of matter may also be prepared by reacting the amine with organic or inorganic acids using conventional laboratory procedures. Such salts are water soluble and have the advantage of being rapidly assimilated.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A compound selected from the group consisting of 1,1 - diphenyl-2-dimethylaminohexanol; 1,1 - diphenyl - 2-ethylaminohexanol, and 1,1-diphenyl-2-aminoheptanol.
2. 1,1-diphenyl-2-dimethylaminohexanol.
3. 1,1-diphenyl-2-ethylaminohexanol.
4. 1,1-diphenyl-2-aminoheptanol.

References Cited in the file of this patent

UNITED STATES PATENTS

| | | |
|---|---|---|
| 1,978,539 | Klarer | Oct. 30, 1934 |
| 2,565,592 | Clark | Aug. 28, 1951 |
| 2,682,543 | Adamson et al. | June 29, 1954 |

FOREIGN PATENTS

| | | |
|---|---|---|
| 361,471 | France | July 17, 1906 |
| 828,495 | France | May 18, 1938 |
| 234,936 | Switzerland | Mar. 1, 1945 |

OTHER REFERENCES

Beilstein's Handbuch der Organischen Chemie, vol. 13, p. 434; 2nd supplement (1950).

Ti: Bulletin de la Faculté des Sciences de l'Université Franco-Chinoise de Peiping, No. 1, p. 9, November 1, 1934.

McKenzie et al.: Deutsche Chemische Gesellschaft (Berichte), vol. 65B, p. 1360 (1932).